UNITED STATES PATENT OFFICE.

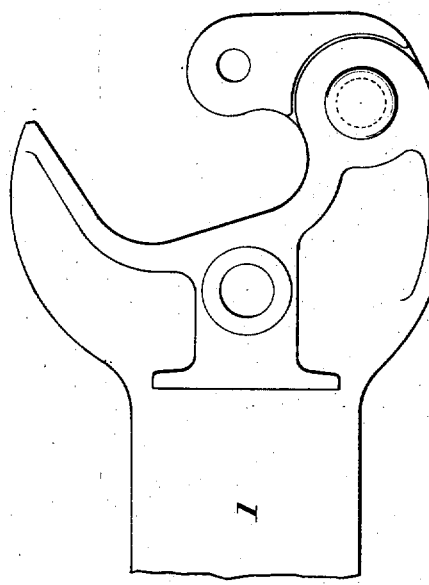
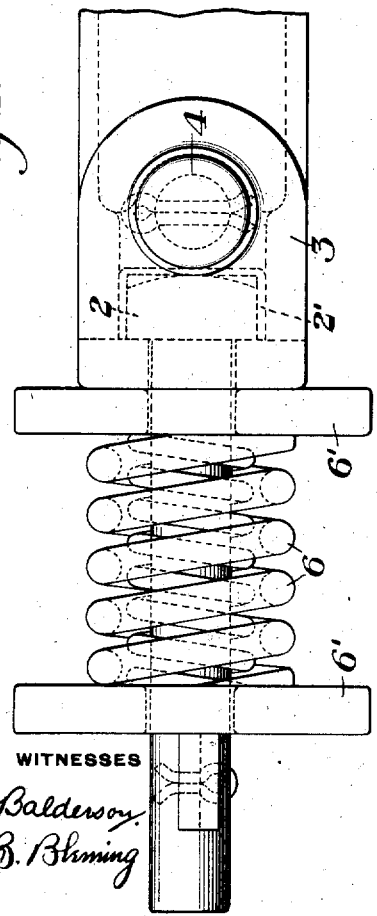
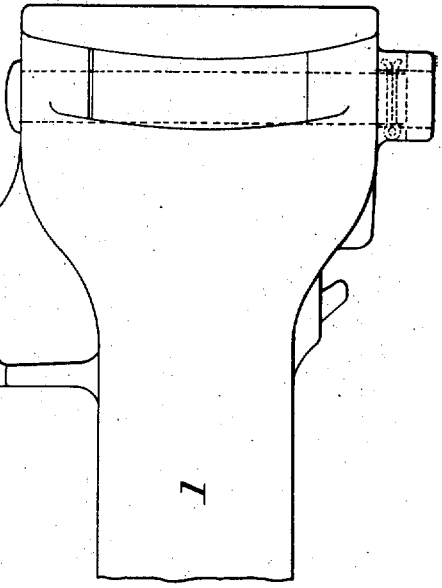
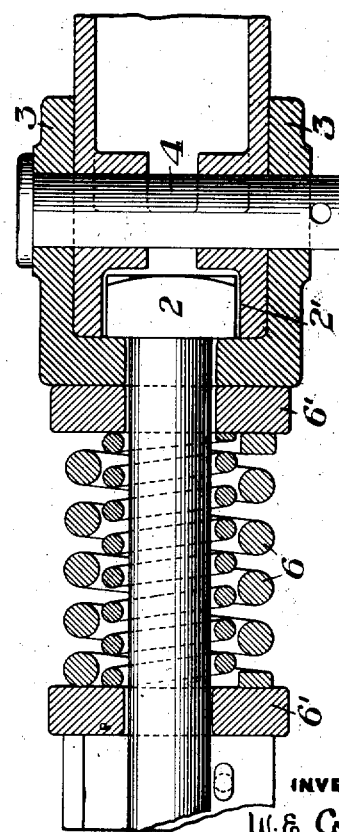

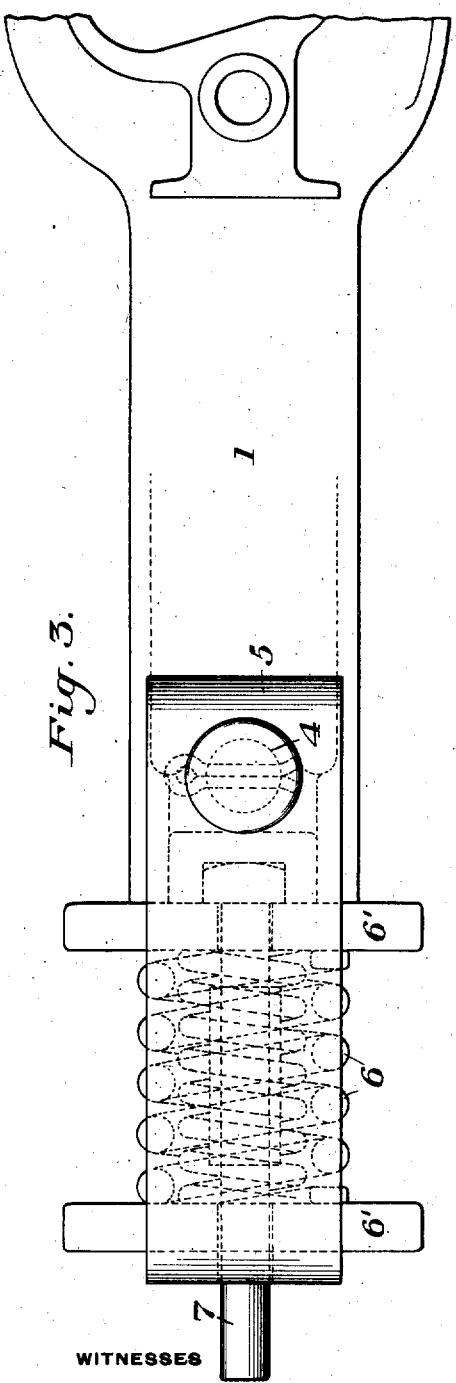
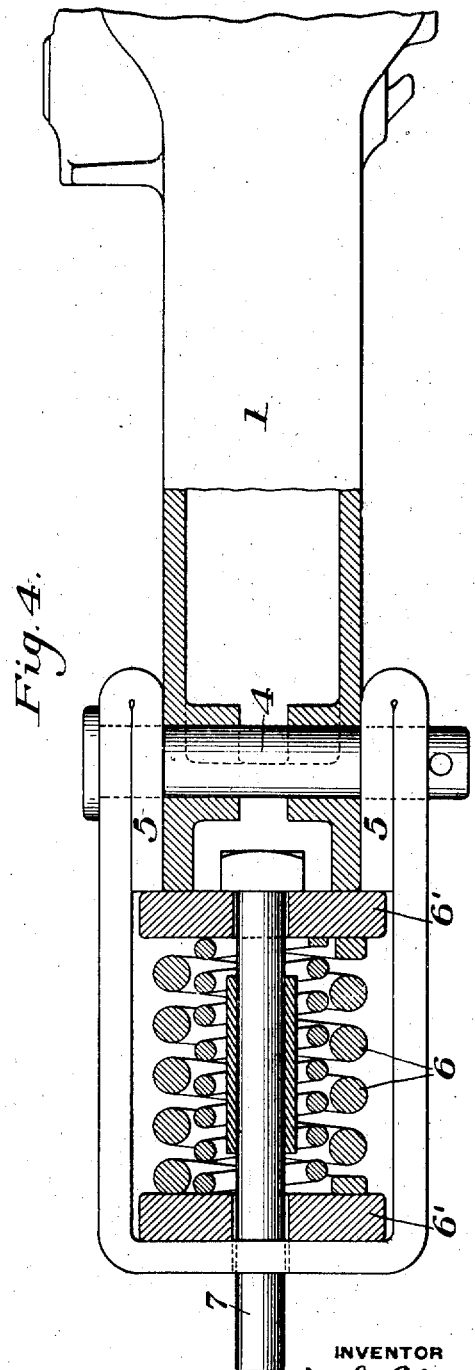

WALTER E. COFFIN, OF CLEVELAND, OHIO, ASSIGNOR TO NATIONAL MALLEABLE CASTINGS COMPANY, OF CLEVELAND, OHIO, A CORPORATION OF OHIO.

CAR-COUPLING.

1,067,798. Specification of Letters Patent. Patented July 22, 1913.

Application filed October 26, 1908. Serial No. 459,458.

*To all whom it may concern:*

Be it known that I, WALTER E. COFFIN, a citizen of the United States, and a resident of Cleveland, in the county of Cuyahoga and State of Ohio, have invented a new and useful Improvement in Car-Couplers, of which the following is a full, clear, and exact description, reference being had to the accompanying drawings, forming part of this specification, in which—

Figure 1 is a plan view of a coupler embodying my invention; Fig. 2 is a vertical longitudinal section thereof; Fig. 3 is a plan view, showing a modified construction; and Fig. 4 is a vertical longitudinal section of Fig. 3.

In couplers as constructed heretofore, it has been difficult to fit them with tail bolts when it is desired to employ tail bolts as a means of connection of the coupler with the draft rigging; for the tail bolt must be inserted lengthwise through the front end of the coupler head, and the cavity therein is sometimes of such restricted shape as to necessitate the cutting down of the head of the bolt. These difficulties are increased when the coupler is of small size, but they are overcome effectively by my invention.

As shown in Figs. 1 and 2 of the drawings, the coupler shank 1 is preferably made without the usual liner block, the shank being preferably of the same external dimension throughout its length, but at its rear end, it has a rearwardly open recess 2′ for the reception of the head 2 of the tail bolt which is inserted therein from the rear. A retaining member or collar 3 of U-shape is fitted on the bolt before the bolt head is set in the recess, and the arms of the retaining piece fit against the top and bottom sides of the coupler shank and are held thereto by a pin 4, which passes through registering holes in said arms and in the shank. Around the pin holes are preferably inwardly projecting portions of the yoke at the back of the recess, and in order to receive the head of the tail bolt, inserted from the rear, the recess is freely open and of a size to receive the head of the bolt and has no rear shoulder for retaining the head. Heretofore, tail bolt holes have had shoulders for receiving the head of the bolt when inserted from within. In my device, on the contrary, the shoulders of the recess for the head of the tail-bolt are in advance of the recess, that is, between the recess and the coupler-head. The draft springs 6 and followers 6′ are applied to the tail-bolt, as shown. The construction is such that the head of the tail-bolt need not conform to the opening in the coupler-head, for the tail-bolt is not passed through the coupler-head.

Figs. 3 and 4 show how the coupler shank of the other figures can be used with a yoke, instead of a tail-bolt, if desired. As the shank has no liner blocks, the ends of the yoke arms can be welded back upon themselves, as shown at 5, so that the arms of the yoke will clear the followers of the draft rigging. The pin 4 secures the yoke to the shank, and a small tail-bolt 7 confines the draft spring or springs in place between the followers.

The construction may be modified within the scope of my claims, since

What I claim is:

1. A coupler having a tail-bolt applied at the rear end of the shank, and a retaining member at the exterior of the shank for securing the tail-bolt to the shank.

2. A coupler having at the rear end of its shank a rearwardly open recess, a tail bolt having an enlarged head within the recess, and a retaining member at the exterior of the shank and engaging the enlarged head.

3. A coupler having a tail bolt with an enlarged head applied at the rear end of its shank, a U-shaped retaining piece engaging the head of the tail bolt and holding it to the coupler shank, and a connection for securing the retaining piece to the shank.

4. A coupler having the rear end of its shank provided with a freely open end recess, a tail bolt having an enlarged head seated within the recess, said shank having inwardly projecting portions forward of the tail bolt head and provided with a through-pin hole, and a retaining device for the tail bolt head secured by a pin extending through the holes in the projections.

In testimony whereof, I have hereunto set my hand.

WALTER E. COFFIN.

Witnesses:
HENRY F. POPE,
HARRY E. ORR.

Copies of this patent may be obtained for five cents each, by addressing the "Commissioner of Patents, Washington, D. C."

Correction in Letters Patent No. 1,067,798.

It is hereby certified that the assignee in Letters Patent No. 1,067,798, granted July 22, 1913, upon the application of Walter E. Coffin, of Cleveland, Ohio, for an improvement in "Car-Couplings," was erroneously described and specified as "National Malleable Castings Company," whereas said assignee should have been described and specified as *The National Malleable Castings Company;* and that the said Letters Patent should be read with this correction therein that the same may conform to the record of the case in the Patent Office.

Signed and sealed this 19th day of August, A. D., 1913.

[SEAL.]

THOMAS EWING,

*Commissioner of Patents.* cess, a tail bolt having an enlarged head seated within the recess, said shank having inwardly projecting portions forward of the tail bolt head and provided with a through-pin hole, and a retaining device for the tail bolt head secured by a pin extending through the holes in the projections.

In testimony whereof, I have hereunto set my hand.

WALTER E. COFFIN.

Witnesses:
 HENRY F. POPE,
 HARRY E. ORR.

Copies of this patent may be obtained for five cents each, by addressing the "Commissioner of Patents, Washington, D. C."

Correction in Letters Patent No. 1,067,798.

It is hereby certified that the assignee in Letters Patent No. 1,067,798, granted July 22, 1913, upon the application of Walter E. Coffin, of Cleveland, Ohio, for an improvement in "Car-Couplings," was erroneously described and specified as "National Malleable Castings Company," whereas said assignee should have been described and specified as *The National Malleable Castings Company;* and that the said Letters Patent should be read with this correction therein that the same may conform to the record of the case in the Patent Office.

Signed and sealed this 19th day of August, A. D., 1913.

[SEAL.]

THOMAS EWING,

*Commissioner of Patents.*

It is hereby certified that the assignee in Letters Patent No. 1,067,798, granted July 22, 1913, upon the application of Walter E. Coffin, of Cleveland, Ohio, for an improvement in "Car-Couplings," was erroneously described and specified as "National Malleable Castings Company," whereas said assignee should have been described and specified as *The National Malleable Castings Company;* and that the said Letters Patent should be read with this correction therein that the same may conform to the record of the case in the Patent Office.

Signed and sealed this 19th day of August, A. D., 1913.

[SEAL.] THOMAS EWING,

*Commissioner of Patents.*